Nov. 28, 1950     I. H. CARLSON     2,531,395
ROUND NUT FEEDING FIXTURE

Filed Nov. 2, 1945     3 Sheets-Sheet 1

INVENTOR
IVER H. CARLSON

BY Ralph L. Chappell
ATTORNEY

Nov. 28, 1950  I. H. CARLSON  2,531,395
ROUND NUT FEEDING FIXTURE
Filed Nov. 2, 1945  3 Sheets-Sheet 2
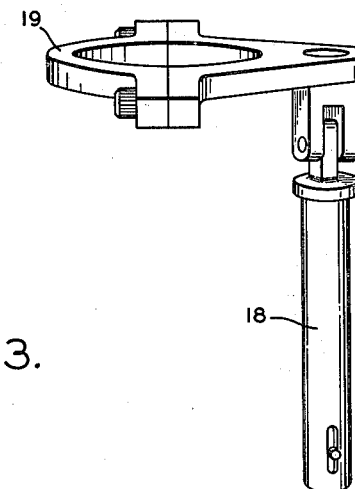
FIG. 3.
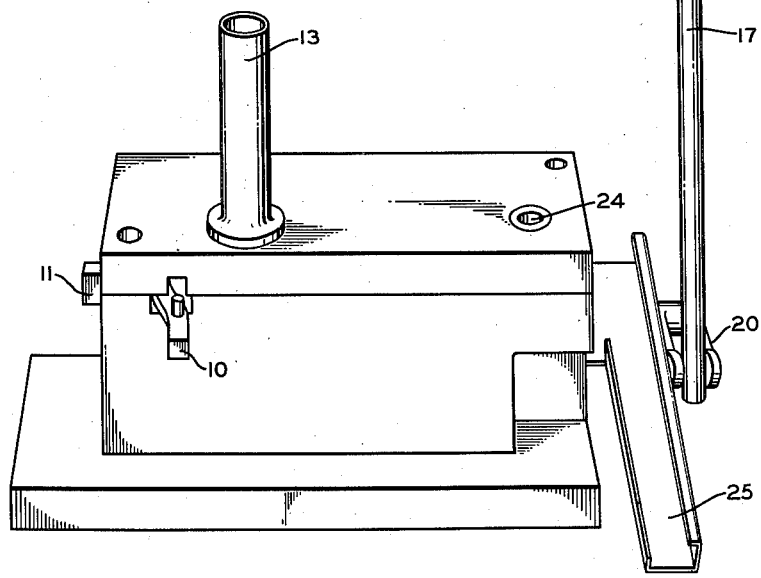
INVENTOR
IVER H. CARLSON
BY Ralph L Chappell
ATTORNEY Nov. 28, 1950   I. H. CARLSON   2,531,395
ROUND NUT FEEDING FIXTURE
Filed Nov. 2, 1945   3 Sheets-Sheet 3
FIG. 4.
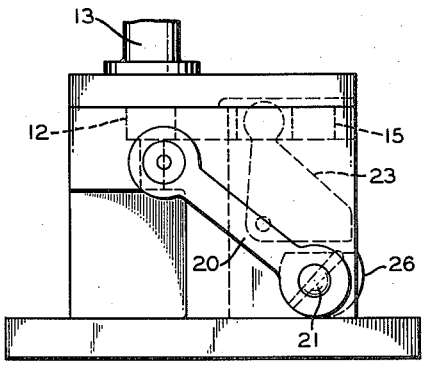
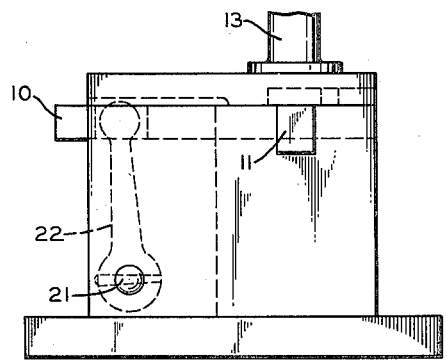
FIG. 5.
INVENTOR
IVER H. CARLSON
BY Ralph L Chappell
ATTORNEY Patented Nov. 28, 1950

2,531,395

UNITED STATES PATENT OFFICE 2,531,395

ROUND NUT FEEDING FIXTURE

Iver H. Carlson, Portsmouth, N. H.

Application November 2, 1945, Serial No. 626,421

6 Claims. (Cl. 10—162)

(Granted under the act of March 3, 1883, as amended April 30, 1928; 370 O. G. 757)

This invention relates to methods and apparatus for holding and discharging certain parts to be machined. More particularly, it relates to a semi-automatic jig used with a machine tool for machining certain parts, for example drilling or tapping circular nuts.

In machining circular parts, it is usually necessary to clamp each part in position by hand, even though a suitable device may be used to feed the parts to the proper position. Clamping a part in position by hand requires considerable time, and if it is necessary to feed and discharge the parts by hand, still more time is taken.

It is, therefore, an object of this invention to provide a jig for parts to be machined, which is simple and easy to operate.

Another object is to provide an efficient time-saving semi-automatic jig for machining such parts.

A further object of this invention is to provide such a jig which is operated and controlled by the machine tool.

Other objects and advantages of this invention will be apparent from the following description and drawings, in which:

Fig. 3 is a perspective front view of the same, with the guide plate in place;

Fig. 4 is an end view with certain parts removed, showing the relative position of internal parts; and Fig. 5 is a view of the other end, showing the relative position of internal parts.

Figure 2:
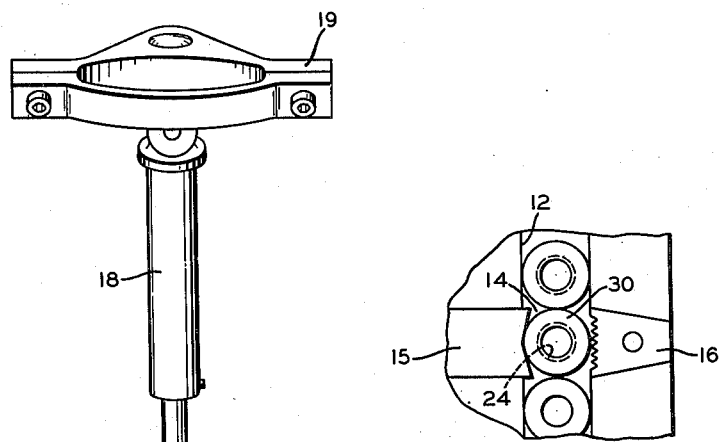
Fig. 2 shows a detail of Fig. 1.
Figure 1:
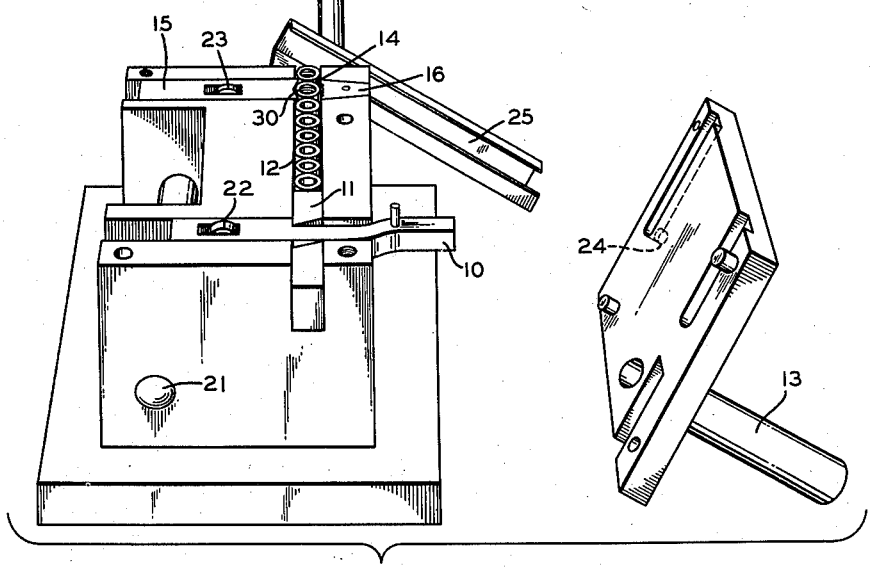
Fig. 1 is a perspective end view of an embodiment of my invention, with the guide plate removed.

Figs. 1, 2 and 3 show an embodiment of my invention which is particularly adaptable to drilling or tapping circular nuts. This comprises feed means 10, 11, 12, for feeding parts from a feed magazine 13 to a machining position 14 and for discharging previously machined parts, clamp means 15 and 16 for clamping the parts in the machining position, operating means 17, 18 and 19 for operating the jig, and a tool guide 24 at the machining position 14.

In the embodiment shown, the means for operating the jig is a telescoping push rod 18 which has a collar 19 attached to one end. This collar is adapted to be attached to the chuck spindle of a drill press or tapping machine, so that the vertical movement of the spindle actuates the push rod. Rod 17 telescopes into rod 18, and between the two may be a spring so as to allow excess movement of the chuck spindle without damaging the jig.

As shown in Fig. 3, the push rod 17 is connected to a crank 20. Referring now to Fig. 4, crank 20 is keyed to an operating shaft 21 which carries a cam 26 cooperating with an angle lever 23. As may be seen in Figs. 1 and 4, movement of angle lever 23 will cause a holding slider 15 to move toward or away from a holding anvil 16 (see Fig. 2), thereby clamping a part 30 which is to be machined.

Referring now to Fig. 5, shaft 21 carries a crank arm 22 which when moved operates a slidable cam 10. As is apparent from Fig. 1 the oblique slot in feed finger 11 and the curvature of slidable cam 10 cooperate to cause feed finger 11 to move in and out in guide slot 12. With the push rod 17 in the down position, as shown in Fig. 1, the crank arm 22 forces member 10 to the extreme right thereby retracting feed finger 11 to allow a circular part to be machined to drop into the guide slot 12. On the up stroke of the push rod 17, arm 22 drives slidable cam 10 to the left, which in turn drives feed finger 11 toward the rear of the jig (as positioned in Fig. 1) by an amount sufficient to position the last machined part out of the clamping device 16 and positioning therein a new unmachined part. In other words, the action of the cam 10 on the down stroke retracts feed finger 11 to allow a circular part to fall into the guide slot 12, and on the up stroke slides the workpieces the desired amount along the feed slot 12. Repeated operations of the jig will move a blank part up guide slot 12 to the machining position 14, which is between holding slider 15 and holding anvil 16. Above and below guide slot 12, between holding slider 15 and holding anvil 16, is a tool guide 24 (Figs. 2 and 3), down through which the drill or tap descends to perform the machining operation.

To summarize the operation of the device, as the drill or tap chuck is lowered, rod 17, 18 moves downward thereby rotating shaft 21 clockwise (Fig. 1), which in turn causes the upper ends of members 22 and 23 to move to the right. Movement of member 23 to the right operates clamping device 15, 16 firmly to hold a workpiece to be machined in position for the machining operation. Simultaneously with this clamping action, crank arm 22 moves sliding cam 10 to the right thereby retracting feed finger 11 to permit another blank workpiece to fall into feed slot 12. After the completion of the machining operation on the workpiece 14, the tool chuck together with rod 17, 18 is raised, thereby imparting counterclockwise motion to the shaft 21. This movement of the shaft causes the arm 23 to move to the left to disengage the clamping means 15, 16, and substantially simultaneously therewith, crank arm 22 moves sliding cam 10 to the left which causes feed finger 11 to move down guide slot 12. This movement of feed finger 11 picks up the blank dropped into the slot 12 on the previous down stroke, moves it along the slot to move the train of unfinished workpieces in the slot to a position where a new blank is positioned at the machining location 14, and discharges the previously machined part down discharge chute 25. The device is then in condition to clamp a new workpiece on the next down stroke of the tool. Push rod 17, 18 and crank 20 are so arranged that the steps described above take place when the tool is out of engagement with the workpiece.

From the foregoing it is apparent that the operator of the drill press need only supply the feed magazine 13 with blanks and operate the drill press in the usual manner, the jig fixture being automatic in operation upon actuation by the push rod 17, 18.

This invention is limited only by the appended claims.

The invention described herein may be manufactured and used by or for the Government of the United States of America for governmental purposes without the payment of any royalties thereon or therefor.

What is claimed is:

1. A semi-automatic jig for drilling or tapping circular parts comprising, a telescoping push rod with a collar on one end adapted to be attached to a drill press or tapping machine chuck spindle, a crank to which the other end of said rod is attached, a shaft carrying said crank, a crank arm keyed to said shaft, a slidable cam operated by said crank arm, said jig having a feed slot, a feed finger operated in said feed slot by said slidable cam, a feed magazine positioned above said feed slot and communicating therewith to feed said circular parts into said feed slot, a tool guide leading into said feed slot, a holding anvil adjacent said tool guide, a holding slider opposite said anvil, a pivot crank for operating said holding slider, said pivot crank being operated by the aforesaid shaft, whereby as said push rod is actuated by vertical movement of said chuck spindle, a new part is picked up and a previously machined part is discharged by said feed finger, a new part is positioned between said holding anvil and said holding slider by said feed finger, said holding slider clamps said part against said holding anvil for drilling or tapping operation.

2. A semi-automatic jig for drilling or tapping circular parts comprising, a push-rod having a collar at one end adapted to be removably attached to a drill press chuck spindle, a crank to which the other end of said rod is attached, a shaft carrying said crank, a slidable cam reciprocally mounted in said jig, means secured to said shaft and operably connected to said slidable cam to impart reciprocating motion thereto, said jig having a feed slot, feeding means in said slot being operable by said slidable cam, a feed magazine positioned to feed said circular parts into said feed slot, a tool guide communicating with said feed slot, a holding anvil disposed adjacent said tool guide, a holding slider opposite said anvil, crank means operable by the aforesaid shaft coupled to said holding slider to impart reciprocating motion thereto, whereby, as said push-rod is actuated by the movement of said spindle, a new part is picked up and a previously machined part is discharged by said feeding means, a new part is positioned between said holding anvil and said holding slider by said feeding means, and said holding slider clamps said part against said holding anvil for drilling or tapping operation.

3. A semi-automatic jig for drilling or tapping circular parts comprising, a body portion, a shaft rotatably mounted in said body portion, a crank keyed to said shaft, a push-rod with a collar at one end adapted to be attached to the chuck spindle of a drill press, said rod being connected at its other end to said crank, a slidable cam reciprocably mounted on said portion, means secured to said shaft and coupled to said cam for imparting reciprocating motion thereto, a feed slot cut in said body portion, a feed finger slidably mounted in said feed slot and operable by said cam, a feed magazine communicating with said feed slot, a tool guide communicating with said feed slot, a holding anvil adjacent said tool guide, a reciprocably mounted slider opposite said anvil being arranged to hold said circular parts, crank means operated by the aforesaid shaft being operatively connected to said slider, whereby as said push-rod is actuated by movement of said chuck spindle, a new part is picked up and a previously machined part is discharged by said feed finger, a new part is positioned between said anvil and said slider by said feed finger, and said slider clamps said part against said holding anvil for drilling or tapping operation.

4. A semi-automatic workpiece holding jig for use with a drill press comprising, a body portion having a longitudinally extending workpiece feed slot therein, said body portion having a drill guideway perpendicular to said feed slot and located at one end thereof, a feed magazine positioned above the other end of said feed slot and communicating therewith to feed workpieces into said feed slot, a reciprocable feed finger positioned in said slot being adapted to pick up a workpiece beneath said feed magazine and to advance a series of workpieces in said feed slot to position a workpiece under said drill guideway, a shaft positioned in said body portion substantially parallel to said feed slot, a crank secured to one end of said shaft, a push rod having means at one end thereof for attachment to a drill press chuck spindle and being attached at its other end to said crank, whereby an oscillatory motion is imparted to said shaft upon up and down movement of said push rod, crank and cam mechanism operatively connected to said shaft and arranged to provide the aforesaid reciprocable motion to said feed finger in synchronism with the up and down movement of said push rod, a holding anvil positioned on said body portion adjacent said feed slot and said drill guideway, a holding slider positioned oppositely of said anvil, and a pivot crank operatively connected to said shaft and arranged to provide reciprocable motion to said slider in synchronism with the up and down motion of said push rod, said holding slider being adapted to clamp a workpiece against said anvil during the downward movement of said push rod.

5. A semi-automatic workpiece holding jig for use with a drill press comprising a body portion having a workpiece feed slot therein, a shaft journalled in said body portion and disposed substantially parallel to said feed slot and having a crank keyed to one end thereof, a push rod having means at one end for attachment to the chuck spindle of a drill press and being attached at its other end to said crank, a crank arm keyed to said shaft, a slidable cam positioned transversely of said feed slot and operated by said crank arm, a feed finger positioned in said slot and operable by said slidable cam, a feed magazine positioned above said feed slot and communicating therewith to feed forkpieces into said feed slot, a tool guide communicating with said feed slot, a holding anvil adjacent said tool guide, a holding slider opposite said anvil, a pivot crank secured to said shaft and arranged to impart a reciprocating motion to said holding slider, whereby as said push rod is actuated by vertical movement of said chuck spindle, a new workpiece is picked up and a previously machined part is discharged by said feed finger, a new workpiece is positioned between said anvil and said holding slider by said feed finger, and said holding slider clamps said new workpiece against said anvil for a machining operation.

6. A semi-automatic workpiece holding jig for use with a drill press comprising a body portion having a work feed slot therein, a shaft journalled in said body portion, a push rod having means at one end for connection to the drill press chuck spindle, a crank secured to said shaft to which the other end of said rod is attached, feed means reciprocably mounted in said feed slot, a reciprocably mounted cam mounted transversely of said feed slot and being operatively coupled to said shaft and arranged to impart reciprocating motion to said feed means in synchronism with up and down movement of said rod, a feed magazine communicating with said feed slot, a tool guide also communicating with said feed slot, a holding anvil disposed adjacent said tool guide, a reciprocably mounted holding slider opposite said anvil, crank means operable by said shaft and coupled to said slider to impart reciprocating motion thereto, whereby, as said push rod is actuated by the movement of said spindle, a new workpiece is picked up and machined workpiece is discharged by said feed means, a new part is positioned between said anvil and said slider, and said slider clamps said workpiece against said anvil for drilling or tapping operation.

IVER H. CARLSON.

REFERENCES CITED

The following references are of record in the file of this patent:

UNITED STATES PATENTS

| Number | Name | Date |
|---|---|---|
| 685,713 | Celley | Oct. 29, 1901 |
| 951,296 | Wilcox | Mar. 8, 1910 |
| 962,464 | Pierpont | June 28, 1910 |
| 1,461,171 | Barnes | July 10, 1923 |
| 1,464,020 | Anderson | Aug. 7, 1923 |
| 1,564,211 | Davis | Dec. 8, 1925 |
| 1,571,021 | Meyer | Jan. 26, 1926 |
| 1,752,468 | Stull | Apr. 1, 1930 |
| 1,846,645 | Lach | Feb. 23, 1932 |
| 2,462,327 | Mills | Feb. 22, 1949 |

Certificate of Correction

Patent No. 2,531,395 November 28, 1950

IVER H. CARLSON

It is hereby certified that error appears in the printed specification of the above numbered patent requiring correction as follows:

Column 2, line 12, before "carries" insert the word *also*; column 4, line 16, before "portion" insert *body*; column 5, line 9, for "forkpieces" read *workpieces*; column 6, line 11, before "machined" insert *a*;

and that the said Letters Patent should be read as corrected above, so that the same may conform to the record of the case in the Patent Office.

Signed and sealed this 26th day of June, A. D. 1951.

[SEAL]

THOMAS F. MURPHY,
*Assistant Commissioner of Patents.*